United States Patent [19]

Kitagawa

[11] Patent Number: 5,450,251
[45] Date of Patent: Sep. 12, 1995

[54] SECTOR RELOCATION SYSTEM IN A MAGNETIC DISC APPARATUS

[75] Inventor: Masayuki Kitagawa, Tokyo, Japan

[73] Assignee: NEC Corporation, Tokyo, Japan

[21] Appl. No.: 234,113

[22] Filed: Apr. 28, 1994

[30] Foreign Application Priority Data

Apr. 30, 1993 [JP] Japan .................................. 5-127925

[51] Int. Cl.$^6$ ................................................ G11B 5/09
[52] U.S. Cl. ......................................... 360/48; 360/53
[58] Field of Search ...................... 360/48, 53; 369/53, 369/54

[56] References Cited

U.S. PATENT DOCUMENTS 4,935,825  6/1990  Worrell et al. ........................ 360/54

FOREIGN PATENT DOCUMENTS 0212099  3/1987  European Pat. Off. .
0243503  11/1987  European Pat. Off. .

OTHER PUBLICATIONS

Computer Technology Review, vol. 11, No. 14, Oct. 1991, Los Angeles, Calif., US, pp. 39–44, Gregory Hite: "Disk sparing methods affect capacity and transfer rates".

Patent Abstracts of Japan, vol. 9, No. 79 (P-347) (1802) Apr. 9, 1985 & JP-A-59 211 158 (Fujitsu K.K.) Nov. 29, 1984.

IBM Technical Disclosure Bulletin, vol. 28, No. 7, Dec. 1985, Armonk, US, pp. 2803–2805: "Method for skipping defective sectors on hards disks".

Primary Examiner—Aristotelis Psitos
Assistant Examiner—W. Chris Kim
Attorney, Agent, or Firm—Sughrue, Mion, Zinn, Macpeak & Seas

[57] ABSTRACT

In a magnetic disc apparatus having data tracks, relocation tracks, and data-saving tracks, each track of these tracks has sectors composed of an identifier and a data part. An identifier includes a logical sector address and flags. And relocation is performed in a sector unit(not in a track unit), and identifiers are used for data identification in relocation.

8 Claims, 8 Drawing Sheets

FIG. 3

| LI0 | LI1 | LI2 | LI3 | LI4 | LI5 | SPF |
|---|---|---|---|---|---|---|
| D0 | D1 | D2 | D3 | D4 | D5 | |

⌐31

L I : Logical Sector Address Indicated by Identifier

D : Data of the Sector

S P F : Relocation Spare Sector Indicated by Flag

| DSF | DSF | DSF | DSF | DEF | DSF | DSF |
|---|---|---|---|---|---|---|

⌐32

D S F : Data-Saving Sector Indicated by Flag

D E F : Defective Sector Indicated by Flag

| LI0 | LI1 | LI2 | LI3 | DEF | LI4 | LI5 |
|---|---|---|---|---|---|---|
| D0 | D1 | D2 | D3 | | D4 | D5 |

| DSF | DEF | DSF | DSF | DEF | DEF | DSF |

41

| DSF | DSF | DEF | DSF | DSF | DSF | DEF |

42

| LI0<br>D0 | DEF | LI1<br>D1 | LI2<br>D2 | DEF | DEF | LI3<br>D3 |

43

| LI4<br>D4 | LI5<br>D5 | DEF | DSF | DSF | DSF | DEF |

| LI0 D0 | LI1 D1 | LI2 D2 | LI3 D3 | LI4 D4 | LI5 D5 | SPF |

50

| LI0 D0 | LI1 D1 | LI2 D2 | DEF | LI3 D3 | LI4 D4 | LI5 D5 |

51

| OCC | OCC | OCC | SPF | DEF | SPF | SPF |

52

OCC : Occupied (by other LI-number)

| LI0 D0 | LI1 D1 | DEF | DEF | LI2 D2 | DEF | LI3 D3 |

53

| OCC | OCC | OCC | LI4 D4 | DEF | LI5 D5 | SPF |

| LI0 D0 | LI1 D1 | LI2 D2 | DEF | LI3 D3 | LI4 D4 | LI5 D5 |
|---|---|---|---|---|---|---|

61

| OCC | OCC | DEF | OCC | SPF | DEF | SPF |
|---|---|---|---|---|---|---|

62

| OCC | DEF | OCC | OCC | OCC | SPF | SPF |
|---|---|---|---|---|---|---|

63

| LI0 D0 | LI1 D1 | DEF | DEF | LI2 D2 | DEF | DEF |
|---|---|---|---|---|---|---|

64

| OCC | OCC | DEF | OCC | LI3 D3 | DEF | LI4 D4 |
|---|---|---|---|---|---|---|

65

| OCC | DEF | OCC | OCC | OCC | LI5 D5 | SPF |
|---|---|---|---|---|---|---|

PRIOR ART

81

| P 0 | P 1 | P 2 | P 3 | P 4 | P 5 | P 6 |
|-----|-----|-----|-----|-----|-----|-----|
| L 0 | L 1 | L 2 | L 3 | L 4 | L 5 | S P |
| C 0 | C 1 | C 2 | C 3 | C 4 | C 5 |     |

P : Sector Number in a Physical Address

L : Sector Number in a Logical Address

C : Contents of the Sector

S P : SPARE

82

| L 0 | L 1 | L 2 | D E | L 3 | L 4 | L 5 |
|-----|-----|-----|-----|-----|-----|-----|
| C 0 | C 1 | C 2 |     | C 3 | C 4 | C 5 |

D E : Defective Sector

83

| Not Used | Not Used | Not Used | D E | Not Used | D E | Not Used |
|----------|----------|----------|-----|----------|-----|----------|

84

| L 0 | L 1 | L 2 | L 3 | L 4 | L 5 | S P |
|-----|-----|-----|-----|-----|-----|-----|
| C 0 | C 1 | C 2 | C 3 | C 4 | C 5 |     |

SECTOR RELOCATION SYSTEM IN A MAGNETIC DISC APPARATUS

BACKGROUND OF THE INVENTION

This invention relates to a sector relocation system in a magnetic disc apparatus, and more particularly to relocation of sectors when one or more than one sector in a track of a magnetic disk apparatus is(are) found defective.

Usually, a spare sector for relocation is provided for each track, and relocation tracks comprising spare sectors for relocation are provided in a magnetic disc apparatus. And usually a magnetic disc apparatus has a micro-processor with RAM(random access memory), and the relocation of sectors is program-controlled by the micro-processor.

FIG. 8 shows an example of relocation of sectors in a prior art. A data track 81(a data track which is an object of relocation is called an object track, and an object track before relocation is called an original track) has seven sectors denoted by P0~P6. Here P means sector number in a physical address(called P-number), where the physical address is determined by physical position of the sector, and since P-number is not changed by relocation, P-numbers are omitted in other drawings.

Sectors of current use have sector numbers in a logical address(called L-number), where the logical address is the position of a sector in a whole virtual storage of the system. A logical address given by a program is converted to a corresponding physical address through a conversion table, and the converted physical address determines the sector to be accessed.

Thus, in the original track 81, L-numbers L0~L5 are assigned to sectors P0~P5 respectively, and a sector designated by P6 is a spare sector for relocation and is denoted by SP. C0~C5 are contents of sectors L0~L5 respectively.

Suppose a sector(P3) in the track 81 is found defective. A first step is to store all contents C0~C5 to a data-saving track(not shown in FIG. 8)temporarily. During whole process of relocation, C0~C5 might be damaged by a process or by an accident. Data stored in the data-saving track can restore damaged data. All contents are read out on a RAM from the original track 81, and then written on the data-saving track. Correspondence of track number and P-number between the original track and the data-saving track is memorized in a data-saving control table, and if L-numbers of the original track 81 are stored in sectors of the data-saving track, the L-numbers do not include track number information.

When contents C3 from the defective sector L3 are not reliable, the data at L3 are made blank.

When there is one spare sector for one defective sector in a track, the relocation is completed in the original sector. All data from the data-saving track are read out on the RAM, and the data on the RAM are written in the original track 81 in the order of the L-number in the original track 81 bypassing the defective sector P3.

The defective sector P3 is marked by DE(Defective Sector), and the use is prohibited. The result of relocation is shown by numeral 82.

When there are two defective sectors (for example, sectors P3 and P5) for one spare sector in an original track, a relocation track 84 is used. All data from the data-saving track are read out on the RAM, and the data on the RAM are written in the relocation track 84 in the order of the P-number in the original track 81. The results of relocation are shown by numeral 83 for the original track and by numeral 84 for the relocation track.

Correspondence of track number and P-number between the original track and the relocation track is memorized in a relocation control table.

In the prior system as described in connection with FIG. 8, all the sectors of the original track 81 is relocated to a relocation track as shown by numeral 84, and indefectible, or undefective sectors of the original track 81 are left unused as shown by numeral 83.

And, if a relocation track has one or more than one defective tracks and can not receive all the L-numbers of sectors in an original track, another relocation track having a sufficient number of indefectible sectors must be used.

This relocation of a prior art, which is made in a track unit, is a waste of sectors as shown by "not used" sectors in a track 83 of FIG. 8. Similar waste of sectors occurs when a relocation track has not a sufficient number of indefectible sectors for receiving all the L-numbers in an original track. And, in an apparatus where total number of sectors per track are different between tracks of different radius, tracks with largest number of sectors must be assigned as relocation tracks.

Further, address correspondence between original tracks and relocation tracks is stored only in the relocation control table, and if contents of the table is lost, it is very difficult to restore the contents.

Similar problems subsist in the data-saving tracks. When a data-saving track does not have a sufficient number of indefectible sectors for receiving all the L-numbers in an original track, no sector of the data-saving track can be used as a data-saving sector. And, in an apparatus where total number of sectors per track are different between tracks of different radius, tracks with largest number of sectors must be assigned as data-saving tracks.

And, also in a data-saving track, address correspondence between original tracks and data-saving tracks is stored only in the data-saving control table, and if contents of the table is lost, it is very difficult to restore the contents.

SUMMARY OF THE INVENTION

Therefore, an object of the present invention is to provide a sector relocation system in a magnetic disc apparatus where sectors are economically used in relocation.

In order to achieve the object, relocation is made in a sector unit, and not in a track unit. All the L-number sectors of an original track are relocated not in a relocation track(or tracks), but in indefectible sectors of the original track and the relocation track(or tracks).

Another object of this invention is to provide means for easily restoring contents of the relocation control table and the data-saving control table. In order to achieve the object, an identifier of a sector having a logical address of the sector, is included in the contents of the sector, and the identifier is transferred to a new sector together with other contents of the original sector. When the contents of the relocation control table or the data-saving control table are lost, the contents of these tables are easily restored from the identifiers.

In a preferred embodiment of this invention, a sector relocation system in a magnetic disc apparatus comprising data tracks, relocation tracks, data-saving tracks, data-saving means and relocation means characterized in that:

each track of the data tracks, relocation tracks, and data-saving tracks has sectors, and each sector has a data part and an identifier which is composed of a logical sector address and flags;

the data-saving means moves contents of all sectors in current use of a data track which is an object of relocation, to a data-saving track or data-saving tracks before relocation; and the relocation means rewrites all identifiers of the object data track and those of a selected relocation track or relocation tracks, in accordance with a status after relocation of each sector in said object track and in said selected relocation track or tracks sector, and moves contents of sectors stored in the data-saving track or data-saving tracks to the object data track and the selected relocation track or relocation tracks in sectors having same logical sector address with sectors in the data saving track or data-saving tracks.

BRIEF DESCRIPTION OF THE DRAWINGS

Further objects, features, and advantages of this invention will become apparent from a consideration of the following description, the appended claims, and the accompanying drawings in which the same numerals indicate the same or the corresponding parts.

FIG. 3 shows an example of data-saving in an embodiment of this invention.

FIG. 4 shows another example of data-saving in an embodiment of this invention.

FIG. 5 shows an example of relocation in an embodiment of this invention.

FIG. 6 shows another example of relocation in an embodiment of this invention.

FIG. 8 shows an example of relocation in a prior art.

DETAILED DESCRIPTION OF THE PREFERRED EMBODIMENTS

Figure 2:
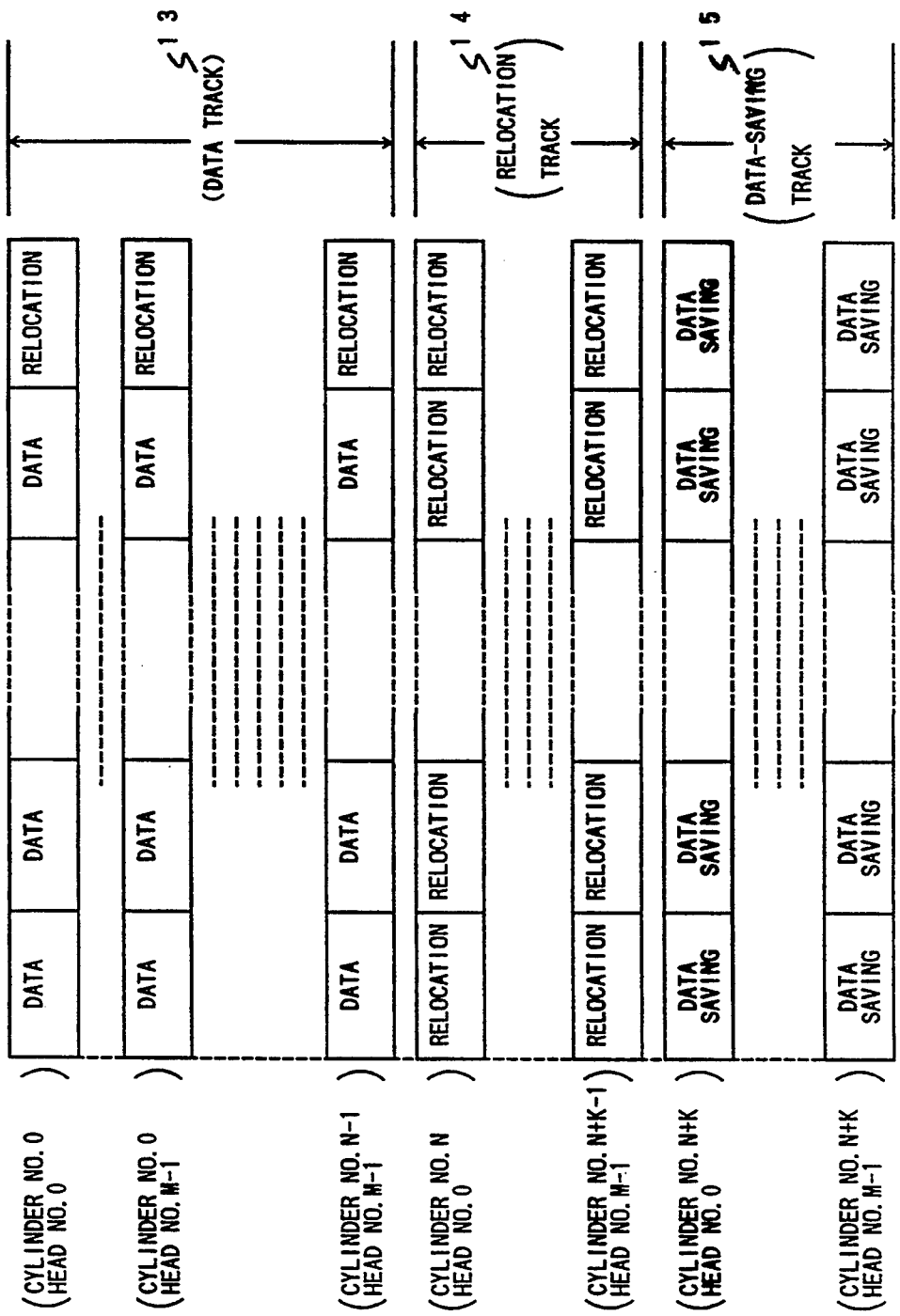
FIG. 2 shows an arrangement of tracks in an embodiment of this invention.

Referring to FIG. 2, there is shown an arrangement of tracks in an embodiment of this invention. There are data tracks 13 of cylinder numbers $0 \sim (N-1)$, relocation tracks 14 of cylinder numbers $N \sim (N+K-1)$, data-saving tracks 15 of cylinder number $(N+K)$. Each cylinder has M tracks with head numbers $0 \sim (M-1)$.

A data track 13 has plural data sectors and a spare sector for relocation. A relocation track 14 has plural spare sectors for relocation, and a data saving track 15 has plural data-saving sectors.

Figure 1:
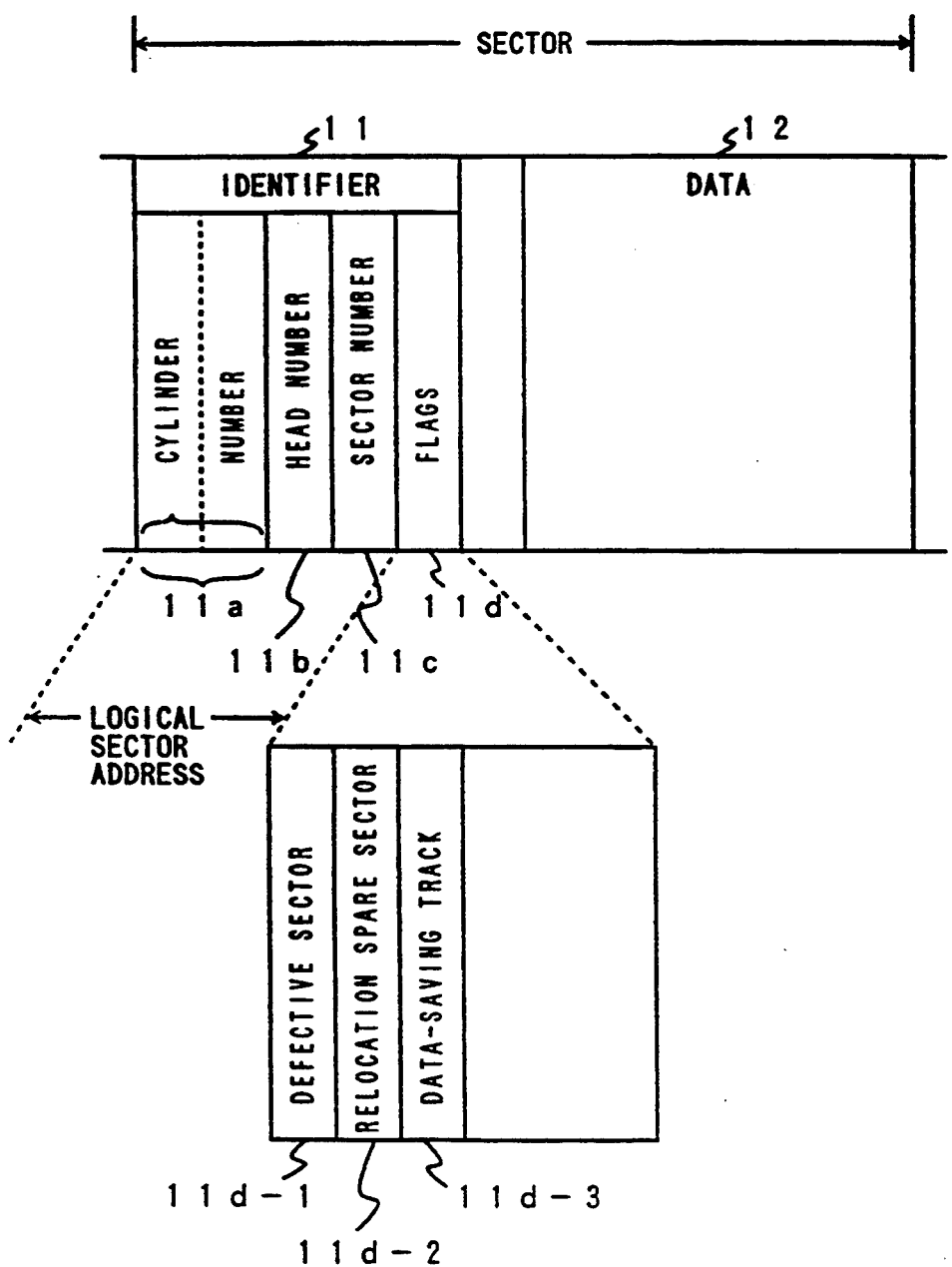
FIG. 1 shows a format of contents of a sector in an embodiment of this invention.

Referring to FIG. 1, each sector of FIG. 2 has an identifier 11 and a data part 12. The identifier 11 of a sector includes a logical address of the data in the data part 12, and the contents of the identifier 11 and the data part 12 of a sector are not to be separated after relocation.

The identifier 11 comprises cylinder number 11a, head number 11b, sector number 11c, and flags 11d. There are three kinds of flags, a defective sector flag 11d-1, a relocation spare sector flag 11d-2, and a data-saving track flag 11d-3.

The cylinder number 11a, the head number 11b, and the sector number 11c compose the logical sector address, and flags indicate the status of the sector. In indefectible data sectors, no flag is set.

Figure 7:
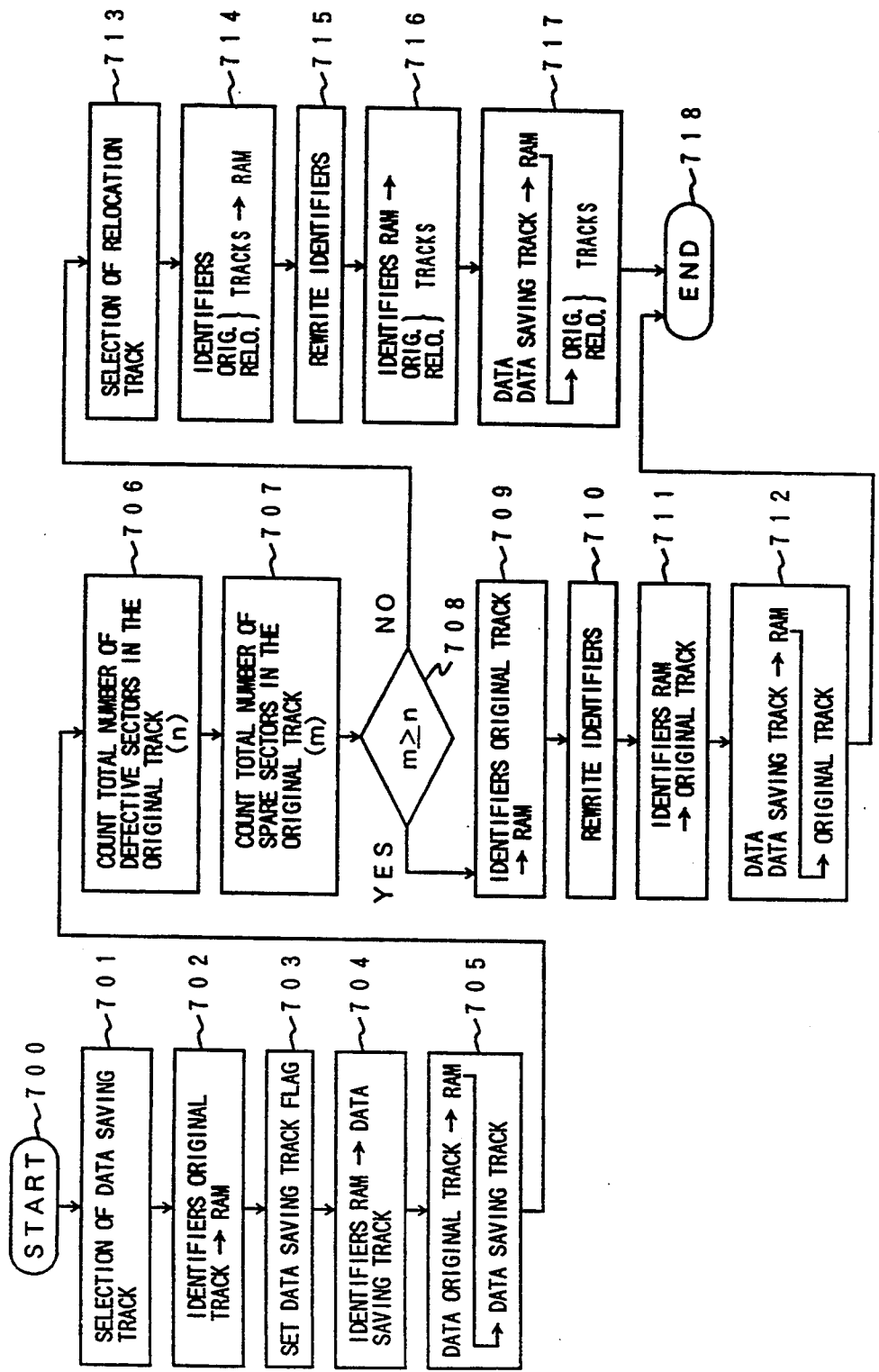
FIG. 7 is a flow chart illustrating an embodiment of this invention.

Now referring to FIG. 7, steps 700~718 are program steps executed in an embodiment of this invention. Steps 701~705 are data-saving steps. When a defective sector(or sectors) is found in a track, and a relocation program is started, the program enters to step 701 through step 700. FIG. 3 and FIG. 4 show examples of data-saving. Contents of a data track 31 are temporarily stored in a data-saving track 32 or in data saving tracks 41 and 42.

In FIG. 3 and FIG. 4, LI denotes a logical sector address indicated by identifier(called LI-number hereafter), SPF denotes a relocation spare sector indicated by flag, DSF denotes a data saving sector indicated by flag, and DEF denotes a defective sector indicated by flag.

There are six sectors in the data track 31 (LI0, LI1, LI2, LI3, LI4, LI5) to be temporarily stored in a data-saving track(or tracks). When there is a data-saving track 32 having not less than 6 DSF's, the track 32 is selected as the data-saving track.

When there are only 4 DSF's in a data-saving track 41, but there are 9 DSF's in all in the data-saving track 41 and another data-saving track 42, these two data-saving tracks 41 and 42 are selected as the data-saving tracks. Then the program step goes to step 702. Identifiers 11 of all the sectors of the data track 31 are loaded on a RAM. In step 703, the data-saving track flag 11d-3 is set in each identifier 11 where no other flag is set. In step 704, identifiers 11 having a data-saving track flag are stored one after another maintaining the original order of LI-numbers, in DSF sectors in the data-saving track 32 or in the two data-saving tracks 41 and 42. In this data-saving storage of step 704, DEF sectors are bypassed.

In step 705, contents of all the sectors in the data track 31 are loaded on the RAM, and data with a logical address on the identifier 11 is stored one after another in a sector of the data-saving track(or tracks) with the same logical address on the identifier 11.

The result of this data-saving is shown by a data-saving track 33 or by two data-saving tracks 43 and 44.

Steps 706~717 are relocation steps, and in step 708, total number n of defective sectors in the data track is compared to the total number m of the relocation spare sector of the track, and when $m \geq n$, the step goes to step 709 which is same to step 702. In step 710, identifiers are rewritten on the RAM. In the first place of the rewrite, flags are modified. When a sector becomes a defective sector after relocation, the defective sector flag 11d-1 is set in the sector, and when a relocation spare sector becomes a data sector after relocation, the relocation spare sector flag 11d-2 is reset.

Then logical sector address in an identifier having a defective sector flag 11d-1 is displaced to a sector having no flag. In this displacement, the original orders of LI-numbers must be maintained. When an original data track 50 of FIG. 5(which is equivalent to 31 of FIG. 3) is found defective in a sector having LI-number 3(LI3), the identifiers of the track 50 are rewritten on the RAM as indicated by identifiers of the track 51. In step 711, the modified identifiers 11 are stored in the original track. In step 712, data of all the sectors are stored in the original data track from the data-saving track through the RAM. In this storage in the original data track, a sector data with an LI-number is stored in a sector having a same LI-number. The result of relocation is shown by track 51 of FIG. 5.

When the decision in step 708 is NO, the step goes to step 713. Step 713(selection of relocation track) is described in connection with FIG. 5 and FIG. 6.

When a data track 51 is found defective in sectors of LI2 and LI4, and the track 51 has no SPF, two sectors must be relocated in a relocation track(or tracks) owing to the newly found two defective sectors. When a relocation track 52 has three(not less than two) SPF's, the relocation track 52 is selected as the relocation track.

OCC in a relocation track means that the sector is occupied by contents relocated from other original tracks and has a different LI-number.

When a data track 61(which is equivalent 51 of FIG. 5) is found defective in sectors of LI2, LI4, and LI5, three SPF's are required for relocation. A relocation track 62 has two SPF's and another relocation track 63 has two SPF's, and tracks 62 and 63 are selected as the relocation tracks.

Steps 714~717 are similar to steps 709~712. The difference is that all the identifiers 11 of the original track and the relocation track(or tracks) are loaded on the RAM in step 714, rewritten in step 715, and stored in the original and the relocation tracks in step 716.

In the rewrite, orders of the LI-number must be maintained throughout the original and the relocation tracks.

In step 717, contents of the data-saving track are loaded on the RAM, and a sector data corresponding to an LI-number is stored in a sector of the original or the selected relocation tracks having the same LI-number.

Sectors denoted by OCC in FIG. 5 and FIG. 6, have different LI-numbers, and are not confused in the storing step 717.

In case when the selected relocation track includes a sector(or sectors) previously relocated from the original track, contents of the sector(or sectors) must also be stored in the data-saving track(or tracks). But steps 713~717 can also be applied in this case.

Sector economy in relocation is evident when a pair of tracks 83 and 84 in the prior art is compared to that of tracks 53 and 54 in the present invention.

And, as shown by tracks 41 and 42, and by tracks 62 and 63, two or more than two tracks can be combined for a purpose of data-saving or for a purpose of relocation. This fact can eliminate special requirements for a relocation track or a data-saving track, which were necessary in the prior art.

As a whole, this invention can increase number of effectively working sectors in a limited number of total sectors.

And in this invention, a logical sector address(or the LI-number) is used for storing a corresponding data, correspondence between data and logical sector address is guaranteed. And since the data-saving track flag 11d-3 is set in the identifier 11, and since the flag is checked in storing the corresponding data, invalid data from the original track is prevented to be stored even when there is a seek error.

And when a conversion table for converting a logical address to a physical address, or a relocation(data-saving) control table is destroyed, the contents of the tables are easily recovered from the identifiers 11 of sectors.

What is claimed is:

1. Sector relocation system in a magnetic disc apparatus comprising data tracks, relocation tracks, data-saving tracks, data-saving means and relocation means characterized in that:

each track of said data tracks, relocation tracks, and data-saving tracks has sectors, and each sector has a data part and an identifier, said identifier comprising a logical sector address and flags;

said data-saving means selects a data-saving track or data-saving tracks, and moves contents of all sectors in current use of a data track which is an object of relocation, to said selected data-saving track or selected data-saving tracks before relocation;

said relocation means rewrites all identifiers of said object data track in accordance with a status after relocation of sectors when a total number of defective sectors in said object data track is not larger than that of relocation spare sectors of said object data track, and moves contents of sectors stored in said data-saving track or data-saving tracks to said object data track in sectors having a same logical sector address as sectors in said data-saving track or data-saving tracks; and said relocation means selects, when the total number of defective sectors in said object data track is larger than that of relocation spare sectors of said object data track, a relocation track or relocation tracks, rewrites all identifiers of said object data track and all identifiers of said selected relocation track or relocation tracks, in accordance with a status after relocation of each sector of said object data track and said selected relocation track or relocation tracks, and moves contents of sectors stored in said data-saving track or data-saving tracks to said object data track and said selected relocation track or relocation tracks in sectors having same logical sector address with sectors in said data-saving track or data-saving tracks.

2. Sector relocation system in a magnetic disc apparatus of claim 1, wherein said data-saving track or data-saving tracks are so selected that a total number of undefective sectors in selected tracks is not less than a total number of sectors in current use before relocation in said object data track.

3. Sector relocation system in a magnetic disc apparatus of claim 1, wherein said relocation means selects said relocation track or relocation tracks when said object data track does not have a sufficient number of undefective sectors for relocating a total number of sectors in current use before relocation, and said relocation track or relocation tracks are so selected that a total number of undefective sectors in said object data track and selected relocation track or relocation tracks is not less than a total number of sectors in current use before relocation in said object data track.

4. Sector relocation system in a magnetic disc apparatus of claim 1, wherein said logical sector address comprises a cylinder number, a head number, and a sector number.

5. Sector relocation system in a magnetic disc apparatus of claim 1, wherein said flags comprise a defective sector flag for indicating a defective sector, a relocation spare sector flag for indicating a spare sector for relocation, and a data-saving track flag for indicating a sector of a data-saving track.

6. Sector relocation system in a magnetic disc apparatus of claim 5, wherein said data-saving means sets said data-saving track flags on identifiers moved from said object data track to said data-saving track or data-saving tracks.

7. Sector relocation system in a magnetic disc apparatus of claim 5, characterized in that: said relocation means modifies said flags whereby a defective sector flag is set in a sector which becomes a defective sector after relocation and a relocation spare flag is reset in a sector which becomes a data sector after relocation in said object data track and said selected relocation track or relocation tracks, and relocates all identifiers of all sectors in current use of said data track to all sectors of said data track having no flag and to sectors of said relocation track or relocation tracks having no flag and not occupied by data relocated from other data tracks, thereby maintaining order in said logical sector address.

8. Sector relocation system in a magnetic disc apparatus of claim 1, wherein said data-saving means moves, in a first step, identifiers of all sectors in current use of said object data track to said data-saving track or data-saving tracks, and in a second step, moves data parts of said all sectors to sectors in said-data saving track or data-saving tracks having a same logical sector address as sectors in said object data track.

* * * * *